(12) United States Patent
Ricketts

(10) Patent No.: US 7,537,689 B2
(45) Date of Patent: May 26, 2009

(54) TERTIARY FILTER

(75) Inventor: Donald D. Ricketts, Monterey, VA (US)

(73) Assignee: Grouse Mountain, Inc., Monterey, VA (US)

( * ) Notice: Subject to any disclaimer, the term of this patent is extended or adjusted under 35 U.S.C. 154(b) by 474 days.

(21) Appl. No.: 10/839,166

(22) Filed: May 6, 2004

(65) Prior Publication Data

US 2005/0000870 A1    Jan. 6, 2005

Related U.S. Application Data

(63) Continuation-in-part of application No. 10/338,704, filed on Jan. 9, 2003, now abandoned.

(51) Int. Cl.
  *B01D 35/16* (2006.01)
  *B01D 29/68* (2006.01)
(52) U.S. Cl. .......... 210/107; 210/121; 210/333.01; 210/413
(58) Field of Classification Search .......... 210/107, 210/108, 155, 158, 159, 121, 333.1, 332, 210/333.01, 340, 341, 162, 355, 413, 414, 210/415, 411, 406
See application file for complete search history.

(56) References Cited

U.S. PATENT DOCUMENTS

| | | | |
|---|---|---|---|
| 2,996,189 A * | 8/1961 | Salterbach | 210/155 |
| 3,640,395 A * | 2/1972 | Kinney | 210/334 |
| 4,082,664 A | 4/1978 | Lindstol | |
| 4,090,965 A | 5/1978 | Fuchs | |
| 4,152,265 A | 5/1979 | Meyers | |
| 4,412,920 A * | 11/1983 | Bolton et al. | 210/409 |
| 4,540,487 A | 9/1985 | Johnson et al. | |
| 4,639,315 A | 1/1987 | Fuchs et al. | |
| 4,923,600 A | 5/1990 | Krofta | |
| 5,354,455 A * | 10/1994 | Burklund et al. | 210/104 |
| 5,356,532 A | 10/1994 | Wilkins et al. | |
| 5,362,401 A | 11/1994 | Whetsel | |
| 5,374,360 A | 12/1994 | Weis | |
| 5,409,618 A | 4/1995 | Price | |
| 5,635,066 A | 6/1997 | Maurer | |
| 5,653,874 A * | 8/1997 | Berry, III | 210/159 |

(Continued)

FOREIGN PATENT DOCUMENTS

DE    39 03 813 C1    6/1990

(Continued)

*Primary Examiner*—Terry K Cecil
(74) *Attorney, Agent, or Firm*—Novak, Druce & Quigg, LLP

(57) ABSTRACT

An apparatus for filtering suspended solids from a liquid having a group of filters mounted inside a filter chamber. The filters divide the chamber into dirty liquid chambers and clean liquid chambers. A wash assembly is disposed within the chamber having vacuum/pump heads in contact with the filters rotates within the chamber. The vacuum/pump heads are connected to a pump and vacuum source located either within or without the apparatus. The vacuum/pump heads either vacuum material up or spray material therefrom in order to clean the filters. As the wash assembly rotates, the vacuum heads are able to contact and clean the entire surface of the filters. The filters are reasonably mounted in the chamber such that they may be removed from the chamber for servicing/replacement without the need to drain the chamber or enter the chamber.

24 Claims, 9 Drawing Sheets

U.S. PATENT DOCUMENTS

| | | |
|---|---|---|
| 5,667,683 A | 9/1997 | Benian |
| 5,876,612 A | 3/1999 | Astrom |
| 5,951,878 A | 9/1999 | Astrom |
| 6,090,298 A | 7/2000 | Weis |
| 6,103,132 A | 8/2000 | Seyfried et al. |
| 6,110,374 A | 8/2000 | Hughes |
| 6,267,879 B1 | 7/2001 | Gil |
| 6,294,098 B1 | 9/2001 | Bergmann |
| 6,447,617 B1 | 9/2002 | Bergmann |
| 6,613,222 B2 | 9/2003 | Mikkelson et al. |
| 6,616,834 B2 * | 9/2003 | Anderson .................. 210/155 |
| 6,634,372 B2 | 10/2003 | Bergmann |
| 6,793,823 B2 | 9/2004 | Hubenthal et al. |
| 6,797,186 B2 | 9/2004 | Hubenthal et al. |
| 6,858,140 B2 | 2/2005 | Smith et al. |
| 6,878,295 B2 | 4/2005 | Hubenthal et al. |
| 2004/0020003 A1 | 2/2004 | Strauser |
| 2004/0124158 A1 | 7/2004 | Smith et al. |
| 2005/0060834 A1 | 3/2005 | Strauser |

FOREIGN PATENT DOCUMENTS

| | | |
|---|---|---|
| DE | 199 37 701 A1 | 1/2001 |
| JP | 55044359 A * | 3/1980 |
| SU | 12 43 768 A1 | 7/1986 |

* cited by examiner

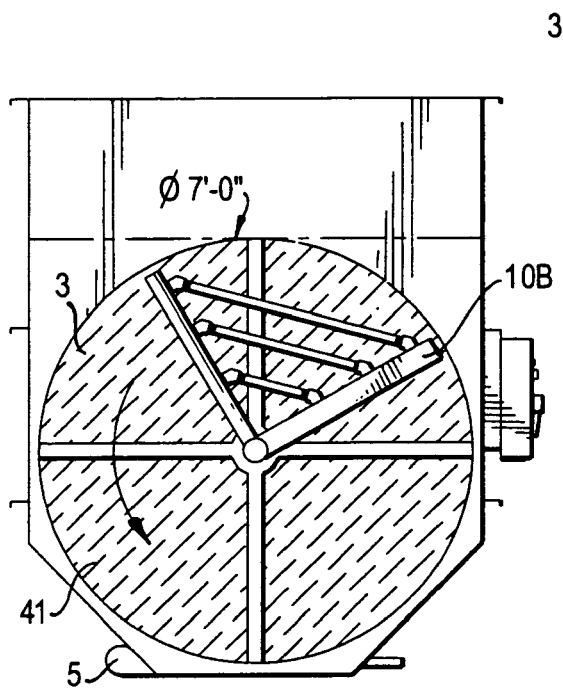
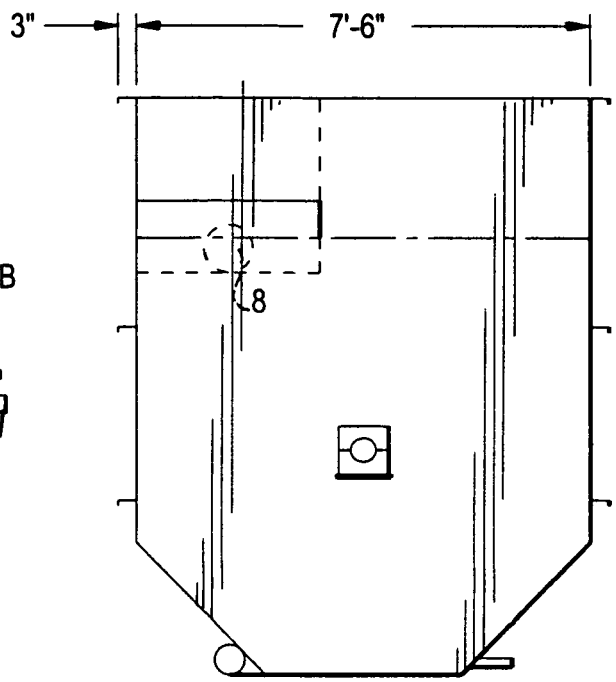
FIG. 7    FIG. 8
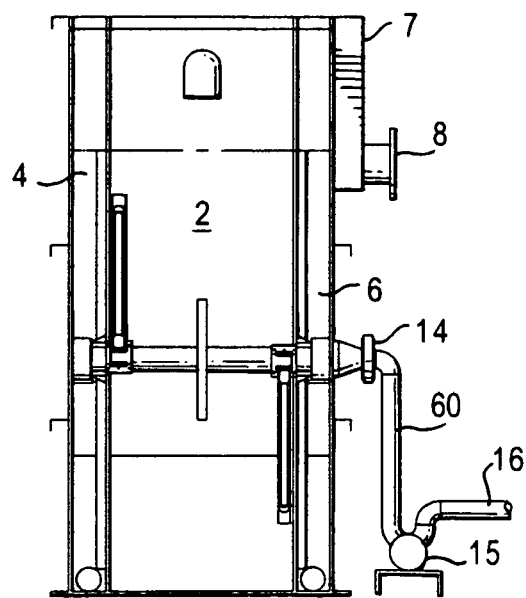
FIG. 9

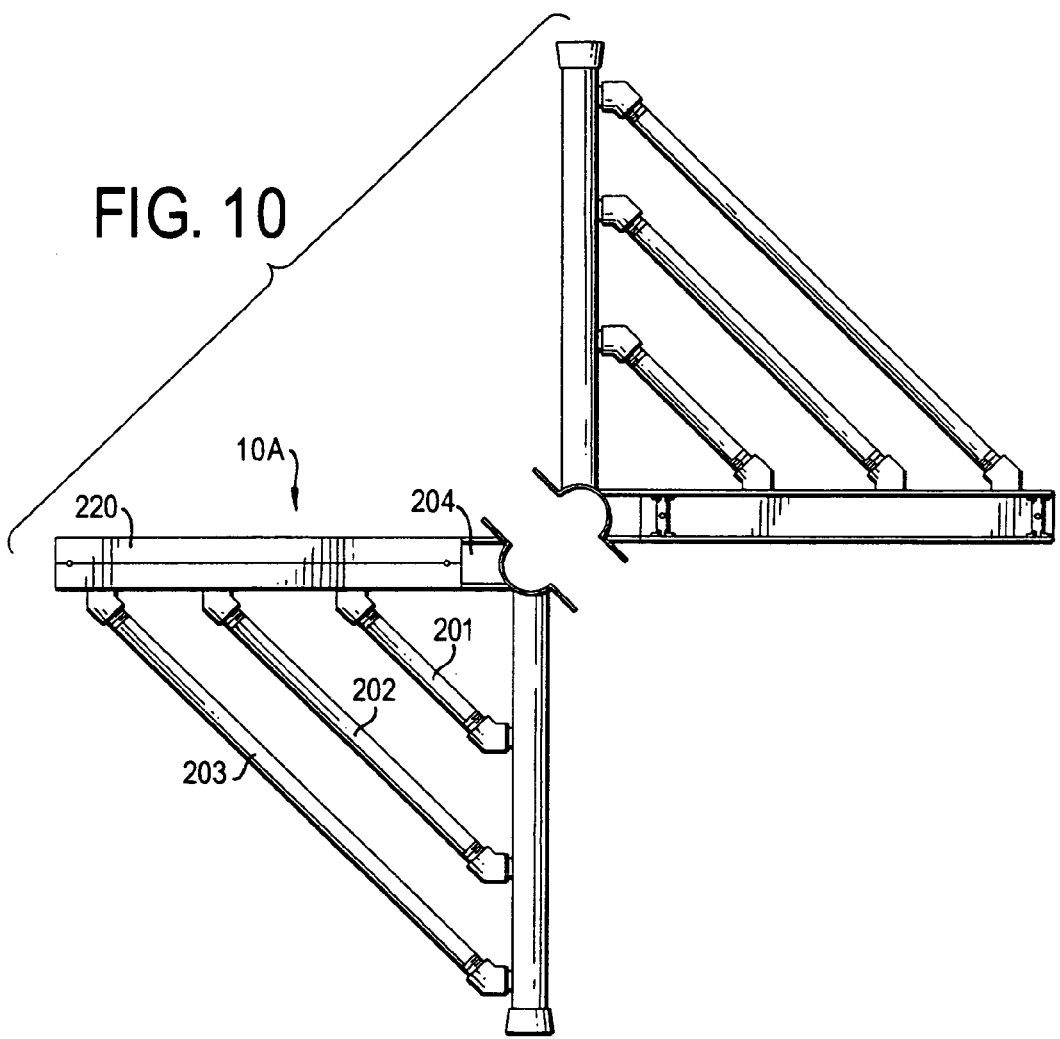
FIG. 10
FIG. 10A
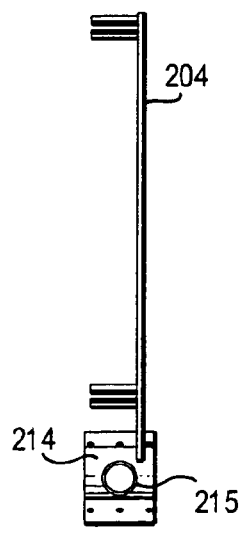
FIG. 10B
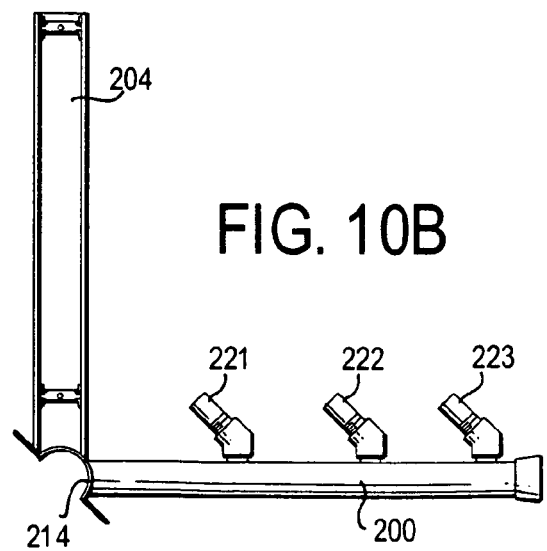

TERTIARY FILTER

CROSS-REFERENCE TO RELATED APPLICATIONS

This application is a continuation-in-part of U.S. Ser. No. 10/338,704, filed Jan. 9, 2003, now abandoned, the entire disclosure of which is hereby incorporated by reference.

FIELD OF THE INVENTION

This invention relates to an apparatus for filtration of material, such as suspended solids, from a liquid effluent.

BACKGROUND OF THE INVENTION

Various filtration apparatus is known in the art. For example, U.S. Pat. Nos. 4,090,965 and 4,639,315, both to Fuchs disclose apparatus whereby a cloth is mounted on a rotatable drum filter on a filter frame. The filter frame defines a boundary between influent and effluent compartments. During filtering, liquid influent containing suspended solids is passed into the influent compartment and flows in a filter direction through the filter into the filter effluent compartment for discharge to an outlet. Intermittent backwashing of the filter material is effected by moving the filter material past a suction head positioned to engage an outer side of the filter material and which is operative to draw filtered liquid from the filter effluent compartment through the filter material in a direction opposite the filter direction, to remove and discharge the entrapped solids with the backwash water. In general, a backwash step is initiated either by a timer at periodic intervals or by sensing a preselected rise in liquid level in the tank as an indication that the filter web is becoming clogged.

Other filter apparatus, such as U.S. Pat. No. 5,876,612 to Astrom, disclose a filter apparatus whereby a vertical disc shaped filter frame is used rather than a drum shape. A filter makes up the outer surface of the disk so that the influent is forced into the inner region through the filter into a effluent region. A backwash suction assembly is located in contact with the filter frame to remove material that may clog the filter. The filter frame is rotated in order to clean the entire filter surface.

However, when the filter becomes clogged, requires extensive cleaning or simply requires replacement in any of the forgoing apparatus of the prior art, an operator must remove outer panels on the apparatus and access the filter frame. The filter frame must then be rotated to a certain position so the operator can avoid the backwash and other assemblies in order to gain access to the filter/cloths. Such processes makes such a filter exchange difficult and time consuming to change filters/cloths.

Further, the filter, frame and any filter cloths make the filter frame assembly bulky and heavy. Rotation of such assembly requires large amounts of energy when such assembly is used in operation and requires special handling when the filters need to be replaced. The assembly becomes even bulkier when the filter is substantially clogged with filtered material requiring even more rotational energy.

Other prior art filter apparatus includes U.S. Pat. No. 5,635,066 to Maurer; U.S. Pat. No. 5,356,532 to Wilkens et al; U.S. Pat. No. 5,409,618 to Price; U.S. Pat. No. 3,640,395 to Kinny; and U.S. Pat. No. 6,267,879 to Gil. Although each of these patents teach filtration apparatus, the construction of the apparatus and the method by which such apparatus is utilized does not enable significant reduction of the time needed to replace/change the filters employed therein. Furthermore, when a filter needs to be changed, the entire apparatus undergoes significant "down time," including draining of the apparatus to gain access to change the filters. Thus, none of the prior art referenced above (each of which is incorporated herein by reference as though set forth in its entirety herein) offers the advantages of the present invention.

SUMMARY OF THE INVENTION

The object of this invention is to address the above-mentioned problems with conventional filter apparatus and to provide a new filter apparatus that requires less energy to operate, is easier to maintain, and allows for efficient replacement of filters.

These and other objects are achieved in a filter apparatus comprising a chamber having an influent for receiving dirty liquid and an effluent pipe for discharging clean liquid, a group of non-rotating filters mounted inside the chamber wherein dirty liquid passes through the filters to create clean liquid, a wash apparatus in contact with the filters disposed within the chamber rotatable about an axis and having a plurality of ports and a motor and drive apparatus for connecting the motor to the wash apparatus such as a gear and chain assembly for rotating said wash apparatus. When the motor rotates the wash apparatus, a cleaning head is able to clean the entire surface of the filter by suctioning filtered material from or washing filtered material off the filters through ports which are located on cleaning heads. In one embodiment, the filters are a polypropylene felt having a 10 micron mesh and are mounted preferably on a polypropylene grid backing plate. In another embodiment, the filters are a long-napped filter cloth or pile comprised of a plurality of fiber bundles of about 15 mm in length secured to a woven fiber backing. Although the most preferably described pile filter has been described, it is to be noted that such filter material can be modified without departing from the spirit and scope of the invention. For example, the fiber bundles can be longer or shorter than the described length; or they may be made from defibrillated filaments instead of fiber bundles; the backing may be any foraminous material, e.g., no woven fabric or even a sheet of plastic which contains perforations therethrough; such that different filters can be used as long as the filtering aspect of the invention is facilitated. In all such instances, it is preferable that the filter material does not rotate, but, rather, is supported by a grid of structural material such as the aforementioned grid backing plate of polypropylene. However, other grid material such as metal, preferably stainless steel, can be used as the supporting grid for the filter material. The supporting grid is preferably formed with a peripheral boundary, which boundary can be linearly inserted into a guiding and supporting mechanism such as C-shaped channels to position and retain the grid (and its associated filter) in a desired position between the dirty liquid chamber and the clean liquid chamber. The C-shaped channels can be continuous or discontinuous and other shapes can be used, such as L, T, or I shapes, or other shapes as long as the function of guiding and positioning the grid (and its associated filter) is achieved. An arcuate path may also be used, but is more cumbersome to manufacture and use than a linear insertion.

The treatment apparatus is divided up into dirty liquid chambers and clean liquid chambers. The filters provide the divisions between them. In one embodiment, the chamber has a single dirty liquid chamber, a pair of filters and a pair of clean liquid chambers. A transfer pipe between the clean liquid chambers maintains a flow between them. One clean water chamber is connected to the effluent pipe as an output for the clean water from the apparatus. In another embodiment a plurality of dirty water chambers and clean water chambers may be provided, preferably in a modular fashion such that the apparatus can be increased by adding additional modules. In yet another embodiment, several filter apparatuses may be provided. Such apparatus can have a modular design to be placed together to filter out materials from a single input influent liquid.

In fact, the modular design of the invention permits the various components parts of the apparatus to be "changed out" without the necessity to drain the tank. In one embodiment, the entire apparatus can be constructed as a self-sustaining module that can be lowered into, or raised from, a treatment tank for servicing of the components thereof, e.g., changing of filters, without the need to drain the tank. As described above, one of the drawbacks of the prior art is the necessity to drain the tank to access the filters to repair or replace them as is necessary from time to time. Workmen thereafter need to enter the drained tank to access the filters (and any associated backwashing device). Not only are the conditions of the tank unsanitary, but the workspace can be quite confining to the average worker. By contrast, the apparatus of the invention not only provides long duration between filter changes, but when it eventually becomes necessary to replace the filters, component parts of the filtering apparatus, e.g., the filter only or the entire apparatus, can easily be removed from the tank without the need to drain the tank. Within the scope of the invention is the ability to remove the supporting grid (and its associated filter) from the filter apparatus while leaving the remainder of the apparatus in place and the tank filled. The removed components can be serviced outside the confines of a tank filled with the filtering apparatus and its drive components, e.g., the filter can be pressured washed and chemically treated for algae, bacteria, etc., or completely replaced. The invention is suitable for use as a separate tertiary filter or in some embodiments within the clarifier portion of a wastewater treatment process. When used in the clarifier, it is possible to eliminate the normal clarifier overflow launder and weir since all of the discharge from the clarifier is through the filter.

In such an instance, a less expensive form of clarifier may be utilized, i.e., a simple gravity hopper bottom design rather than a clarifier with integral mechanism for sludge collection, such as a simple clarifier with a scraper, due to the fact that the filter mechanism is more efficient in removing impurities than is a gravity clarifier.

A sludge return pump can be positioned at the bottom of the clarifier, which acts as a normal sludge return pump for the well known activated sludge process, as well as returning solid material which is rejected by the filter.

When used in the clarifier portion of a wastewater treatment apparatus, the invention requires no separate tank, which saves not only the cost of the separate tank, but, also, the cost and maintenance of a pump and piping to transport the liquid from the clarifier to the filter.

Furthermore, because there may be no separate tank for the filter apparatus, less space is required for the treatment system.

The invention also permits retrofitting of existing tanks. Thus, tanks made of fiberglass, steel, concrete, and other materials can serve as the enclosure for the filtering apparatus of the invention.

The wash assembly preferably comprises cleaning heads connected to respective manifolds, which are mounted onto a hollow axle. Vacuuming and suctioning forces provided from outside the filter apparatus are transferred into the apparatus via the hollow axle, through the manifolds and into the cleaning heads. The vacuuming and suctioning forces are generated by a pump and suction reversible motor. The use of a pile fabric supported and secured to a foraminous backing permits the pile to be pulled from the supporting grid by the vacuuming and suctioning forces and dislodge any build-up retained in the pile in a manner like the vacuuming of a pile carpet straightens the fibers permitting dirt contained within the carpet to be suctioned off.

In yet another embodiment, a control is connected with the rotational motor and the vacuum/pump motor which provides suctioning and pumping forces. The control, via a timer or a predetermined program, determines when to run a cleaning cycle to remove build-up from the filter. A float may also be provided inside the dirty liquid chamber to indicate when the filter is running slow and to assist in control the operation of the filter. At such a time, a signal may be sent to the control to begin a cleaning cycle, or to generate an audible or visual signal calling attention to the fact that filter replacement may be required.

BRIEF DESCRIPTION OF THE DRAWINGS

The invention will now be explained and objects other than those set forth above, will become apparent when consideration is given to the following detailed description which makes reference to the annexed drawings wherein:

FIG. 7 illustrates a sectional view along line C-C in FIG. 4;

FIG. 8 illustrates a sectional view along line D-D in FIG. 4;

FIG. 9 illustrates a sectional view along line E-E in FIG. 4;

FIGS. 10 and 10A-10D illustrate the backwash suction apparatus of the filter apparatus shown in FIG. 1;

DETAILED DESCRIPTION OF THE INVENTION

A detailed view of a first embodiment of the invention is disclosed in FIGS. 1-11. The filter apparatus is a filtration device for removing particles from a liquid. The apparatus may be used as a tertiary filtration system for filtering out such particles following treatment from an industrial or municipal wastewater treatment plant. The device may also be used as a primary filtration system in other capacities.

FIGS. 1-4 show the general features of a filter apparatus 100, which is generally of a box shape comprising several inner compartments. In one embodiment, the liquid to be filtered enters an upper portion of apparatus 100 via an influent pipe 1. Inside the apparatus the liquid is filtered to remove solids from the liquid. The cleaned liquid then passes through a discharge box 7 and is discharged through a discharge pipe 8.

Figure 3:
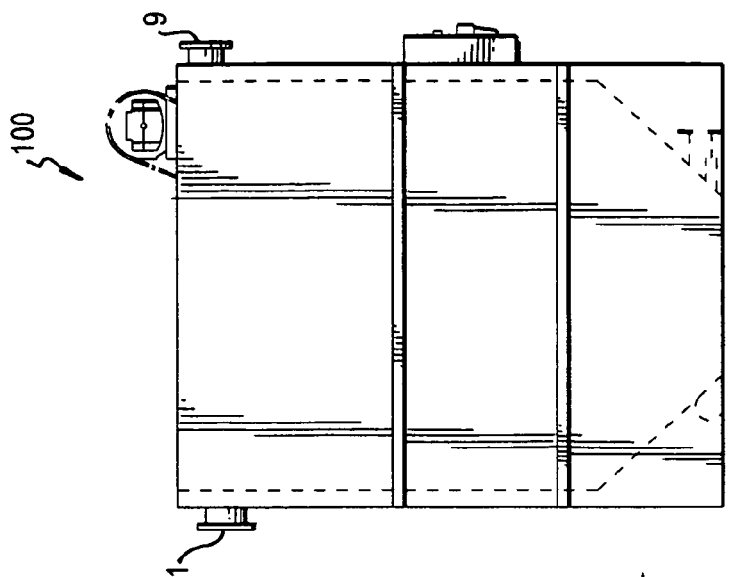
FIG. 3 illustrates a second side view of the filter apparatus shown in FIG. 1.
Figure 2:
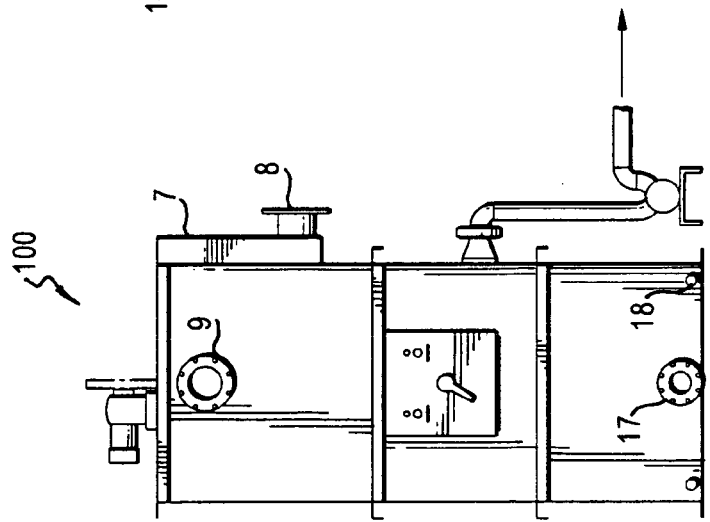
FIG. 2 illustrates a front view of the filter apparatus shown in FIG. 1.
Figure 1:
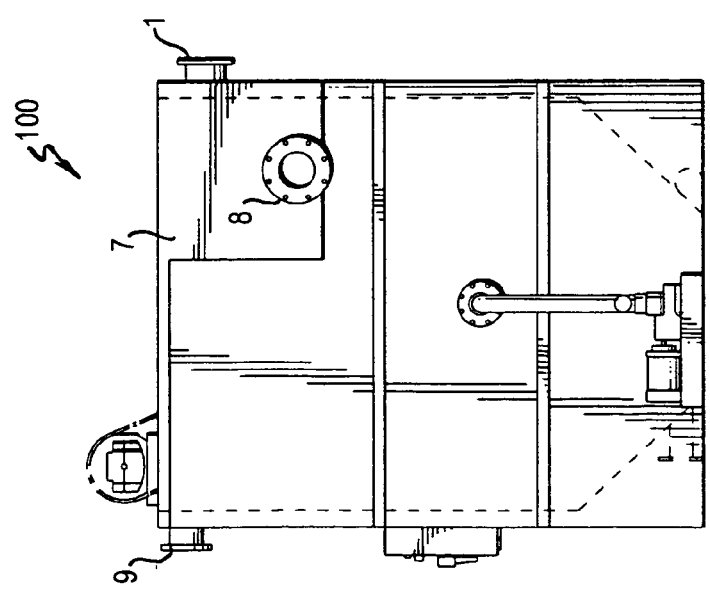
FIG. 1 illustrates a first side view of a filter apparatus according to a first embodiment of the invention.
Figure 4:
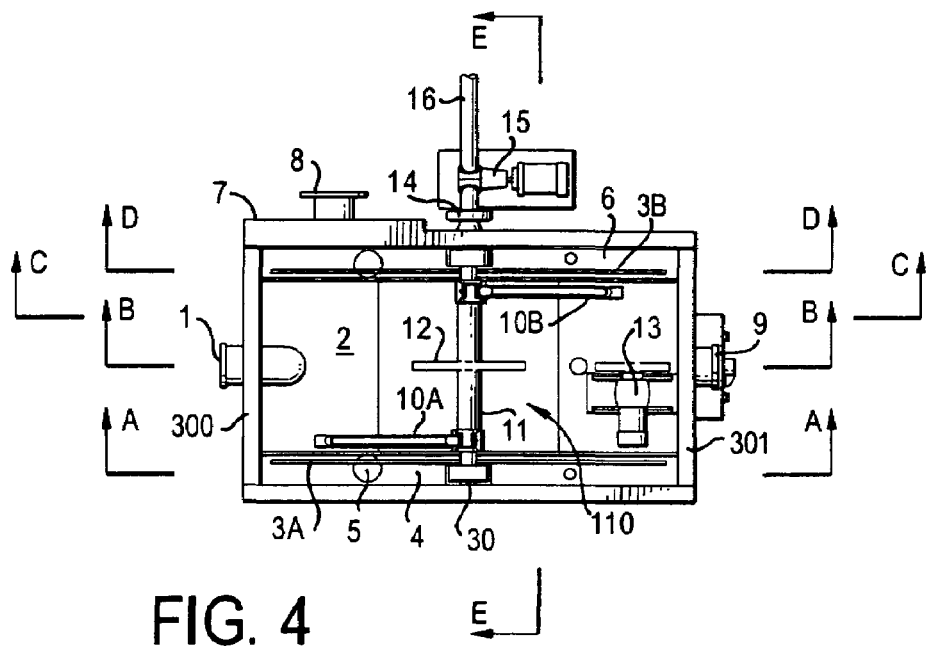
FIG. 4 illustrates of top sectional view of the filter apparatus shown in FIG. 1 showing the major components thereof.

As shown in FIG. 4, apparatus 100 is divided into three compartments, a dirty liquid chamber 2 and two clean liquid chambers 4 and 6. A transfer pipe 5 interconnects the bottom each of the clean water chambers 4 and 5 and to allow free flow of liquid between them. Filter assemblies 3A and 3B are mounted inside the apparatus and provide a division between dirty liquid chamber 2 and clean liquid chambers 4 and 6. Dirty liquid entering through pipe 1 fills dirty liquid chamber 2. The water then passes through filter assemblies 3A and 3B which removes solids from the liquid to clean the liquid. The clean liquid then moves into clean water chambers 4 and 6. Clean liquid in clean water chamber 4 moves through transfer pipe 5 to clean water chamber 6. The clean water then exits the apparatus through discharge box 7 and discharge pipe 8.

Figure 14:
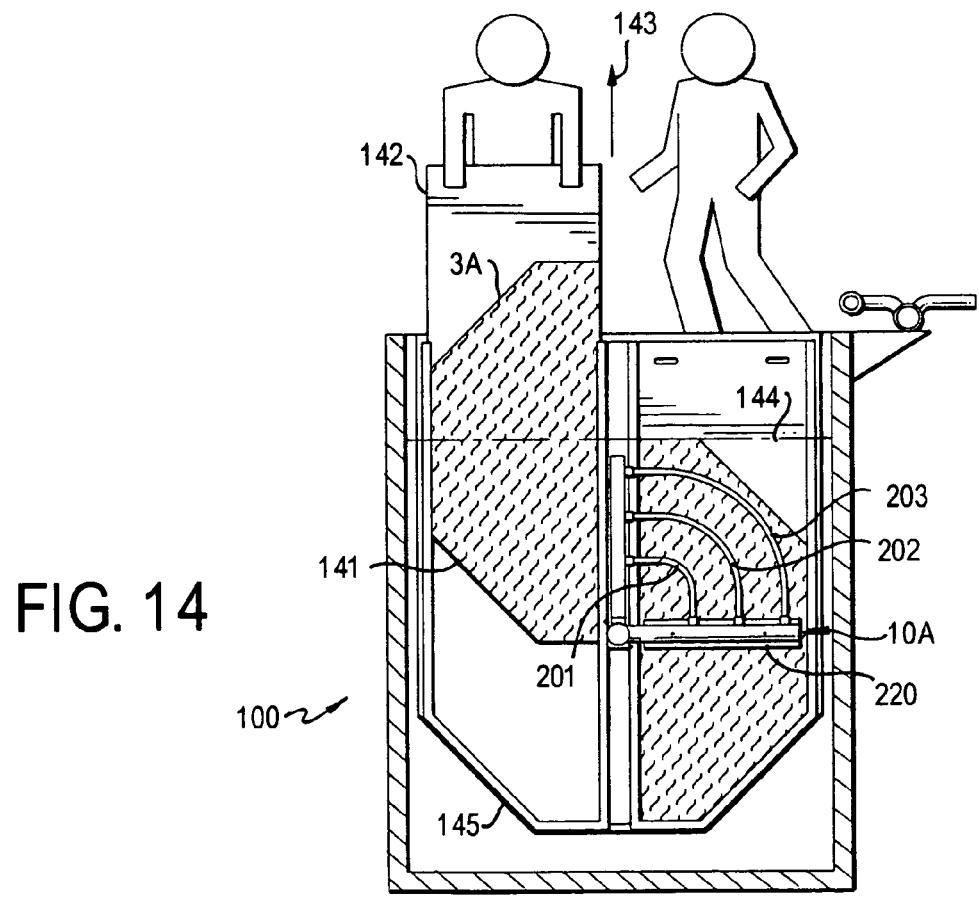
FIG. 14 illustrates the easily removable non-rotating filter panels of the invention.

In the embodiment of FIG. 14, filter assembly 3A is mounted in channel 145 of generally C-shaped configuration surrounding grid 142. Grid 142 is easily removable from the apparatus 100 by withdrawing it in an upward manner along the direction of arrow 143 to remove it from an open top of apparatus 100. It is to be understood that each of the filters 141 and supporting grid can be removed in this manner without draining the dirty water 144 from apparatus 100 nor disassembling the vacuum/suction apparatus including wash arm 10A, 10B (FIG. 7) and vacuum head 220, or associated conduits 201, 202, 203.

Figure 5:
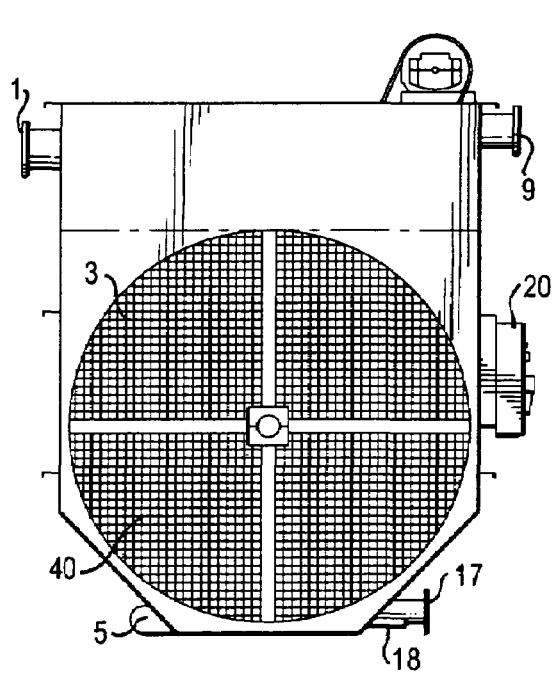
FIG. 5 illustrates a sectional view along line A-A in FIG. 4.
Figure 6:
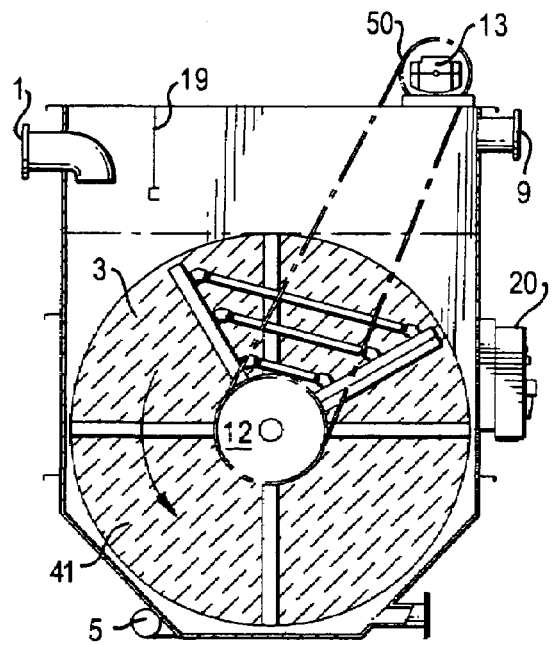
FIG. 6 illustrates a sectional view along line B-B in FIG. 4.
Figure 10C:
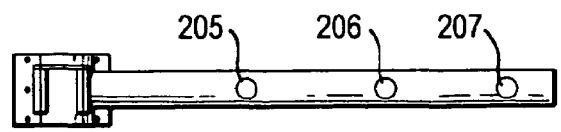

In the embodiment, as shown in FIGS. 5, 6 and 7, each filter assemblies 3A and 3B is a divider between dirty liquid chamber 2 and clean liquid chambers 4 and 6. Filter assemblies 3A and 3B comprises four grid backing plates 40 generally arranged in a circular configuration divided into four quadrants. Each backing plate 40 is removable separately from the filter apparatus to allow changing of the plates. Backing plates 40 are preferably made of a material selected from the group of plastic and metal, such as polypropylene or stainless steel.

On the inside of each grid backing plate 40 is a filter 41 (FIGS. 6 and 7). The filter, in conjunction with backing plate 40 removes solids from the liquid passing from dirty liquid chamber 2 to clean liquid chambers 4 and 6. Filter 41 is preferably a cloth media that is stretched over the surface of grid backing plate 40. It may be made of a cloth polypropylene felt or pile supported by a farminous backing. It preferably comprises apertures of about 10 microns width. However, any filter media capable of filtering out a desired solid may be used.

Figure 11A:
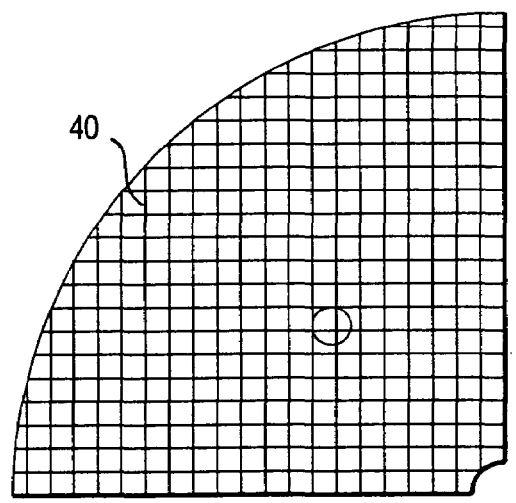
FIGS. 11A and 11B illustrate the filter screen of the filter apparatus shown in FIG. 1.
Figure 11B:
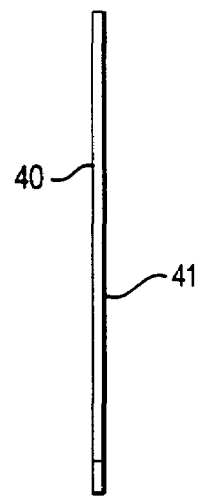

The structure of each removable grid backing plate 40 having an associated filter 41 mounted thereon is shown in FIGS. 11A and 11B. Each grid backing plate basically is a quarter circle shape having filter 41 applied to a surface thereof The combination removes desired solids from the dirty liquid.

After extended use of the apparatus, the solids filtered out of the dirty liquid by filters 41 begin to accumulate, causing the filter to become clogged. To remove excessive solids, the apparatus is provided with a wash assembly 110. Wash assembly 110 comprises a pair of wash arms 10A and 10B mounted on a hollow axle 11. The wash arms 10A and 10B are placed into contact or near contact with filter assembly 3 and are used to wash filters 41 of such accumulated solids by either vacuuming and/or rinsing. In order for the wash arms 10A and 10B to clean the entire surface of filters 41, the wash arms rotate about hollow axle 11 (shown in FIGS. 4, 6 and 7) mounted perpendicular to filters 41. As such, wash arm 10A and 10B are mounted on hollow axle 11 and are in fluid connection allowing for vacuum and rinsing forces to pass from hollow axle 11 to wash assembly 100.

Hollow axle 11 rotates about its axis via a pair of bearings 30 attached at either side of filter apparatus 100, and may rotate either in a clockwise rotation or in a counter clockwise rotation. A wash motor 13 mounted on an upper surface of filter apparatus 100 provides the driving power to rotate hollow axle 11 via a disk gear 12 provided on the hollow axle. The rotation may be at one revolution per minute at intervals, and need not be continuous. The rotation may be at any speed and interval necessary to adequately clean filters 41 (or 141). A chain or belt extends between a disk gear on wash motor 13 and disk gear 12 to transfer rotation of motor 13 to axle 11 and hence wash assembly 110.

Connected to a distal end of hollow axle 11 from outside the filter apparatus is a vacuum and hydraulic pump assembly (shown in FIGS. 4 and 9), comprising a wash pump 15, a wash discharge pipe 16, a connecting pipe 60 and a wash axle seal 14. Such components are electrically connected with wash motor 13 to operate simultaneously. Wash pump 15 provides either a pumping force or provides a suction force. Such forces are transferred to wash assembly 110 via connecting pipe 60 and hollow axle 11. All such components are in fluid contact and provide a conduit for suctioning and pumping forces. Wash axle seal 14 provides a seal between connecting pipe 60 and hollow axle 11 to allow for rotation of the hollow axle with respect to the connecting pipe without losing any vacuum or pumping pressure of the pump assembly. Fluid that is being pumped into the filter apparatus and solids that are vacuumed off the filter in the apparatus retrieved by the pumping assembly are either received or discharged through wash discharge pipe 16.

The structure and design of wash assembly are shown in FIGS. 10 and 10A-D. Wash arm 10A comprises a hollow rectangular box shaped vacuum head 220 which is provided with a series of connection holes 401, 402, 403 along a side thereof and a series of vacuum/wash holes 270,271, 272 along another side thereof. The vacuum/wash holes may be a series of round holes or long slits along the side thereof or may be a single slit along the entire surface. Such design will depend on the particular solids to be removed. Vacuum head 220 has a pair of dividers 212 and 213 which divide the inner region of the vacuum head into three vacuum compartments 300, 301 and 302, each of different length. Each connection hole 401, 402 or 403 provides an inlet to each respective vacuum compartment 300, 301 or 302. A suction or wash force supplied to connection holes 401, 401 and 403 will be transferred to vacuum/wash holes 270, 271, or 272, respectively.

Vacuum head 220 is attached a wash frame 204, which is attached to a wash bracket 214. Wash bracket attaches directly to hollow axle 11 in wash assembly 110. Wash frame 204 extends radially from hollow axle 11 allowing vacuum head 220 to make a radial sweep as wash assembly 110 rotates. The vacuum head 220 is held in contact to filters 41 by a spring or other means (not shown).

Additionally attached to wash bracket 214 is a wash manifold 200, which is a hollow cylinder extending radially away from hollow axle 11. The connection between wash bracket 214 and wash manifold 200 is a fluid connection, whereby a hole 215 connects the inner chamber of the wash manifold through the wash bracket. Hollow axle 11 also has a hole at the location where wash bracket 214 attaches to it. When the wash bracket is connected to hollow axle 11 as shown in FIGS. 4, 6 and 7, the inner chamber of hollow axle 11 is in communication with the inner chamber of wash manifold 200.

Wash manifold 200 additionally has three consecutive manifold connection holes 221, 222 and 223 along its length. Connection tubes 224, 225 and 226 connect between the manifold connection holes 221, 222 and 223 and the vacuum head connection holes 401, 402 and 403. Such system intercommunicates the inner chamber of wash manifold 200 to the three chambers of the vacuum head 220.

Because of the rotation of vacuum head 220 about the axis of hollow axle 11, vacuum/wash hole 272 which is nearer the rotational axis will cover less surface across filter 41 than vacuum/wash hole 270 since vacuum/wash hole 270 is farther from the rotational axis. This implies that the farther from the center of rotation, the amount of solids and dirty liquid removed at a particular radius will increase. For example, if a similar suction is provided across the entire vacuum head 220, vacuum/wash hole 270 would vacuum up more material than vacuum/wash hole 272. Such an arrangement means that substantially more solids and dirty liquid enter wash manifold 200 from connection tube 226 than tube 224.

To provide a more efficient operation of the filter, it is advantageous to provide a more uniform rate of removal of solids and dirty liquid across filter 41. There are various methods to achieve a uniform rate. A first method is to alter the diameter of manifold connection holes 221, 222 and 223. Such can be done by placing a reducer or washer in the connection hole, making the piping different sizes at the connections, or any other means by which the amount of fluid passing through the connection hole can be restricted. Making manifold connection hole 221 smaller in diameter will restrict the amount of solids and dirty liquid that can be removed through vacuum/wash hole 272. Altering the diameters of manifold connection holes 222 and 223 provides similar results to vacuum/wash holes 271 and 270, respectively. Making the diameter of manifold connection hole 221 smaller in diameter than the diameter of manifold connection hole 222, which is in turn made smaller than the diameter of manifold connection hole 223 will provide a smaller amount of solids/dirty liquid removal in the areas nearer the rotational axis, namely at vacuum wash hole 272 and a greater amount of removal at vacuum wash hole 270, which will provide a more uniform removal across vacuum head 200.

Another method to achieve a more uniform removal rate across vacuum head 220 is to alter the relative sizes of the vacuum/wash holes 270, 271, 272. For example, making vacuum/wash hole 272, the nearest to the rotational axis, smaller than vacuum/wash hole 271, which in turn is made smaller than vacuum/wash hole 272 would also restrict the amount of solids and dirty water taken in by the vacuum/wash holes nearer the rotational axis and allow more solids and dirty water to be taken in by the holes farther away from the rotational axis.

While a group of three divisions of vacuum head 220, namely vacuum compartments 300, 301 and 302, such is used by way of example, more or fewer divisions may be used to provide a uniform rate of removal of solids.

While the embodiment shown in FIG. 4 includes only one vacuum head, such design is by way of example. More than one vacuum head may be used, such at that shown in FIG. 10D whereby two vacuum arms are attached to one another. Other embodiments are additionally possible.

Filter apparatus 100 is further provided with a control 20 (shown in FIGS. 5 and 6) for controlling the operations of the wash assembly 110 and the hydraulic pump assembly. Connected to control 20 is a float level switch 19 provided in dirty liquid chamber 2 and is to provide information regarding the level of the dirty water. By information received from float level switch, control 20 begins or ends operation of the wash assembly or the hydraulic pump assembly. For example, when the dirty water level in dirty liquid chamber 2 rises sufficiently during a filtering operation of the filter apparatus, which would generally indicate that the filter has a substantial build-up of solids, control 20 would activate either a vacuum operation or a wash operation. A vacuum operation would activate the wash pump 15 to perform a vacuum operation and simultaneously activate wash motor 13 to begin rotation of the wash assembly. On the other hand, a wash operation would activate wash pump 15 to perform a pumping operation and also simultaneously activate wash motor 13. While use of control 20 is preferred, such activations may be done manually or with the aid of a timer. In an alternate embodiment, an audible or visual signal is generated indicating that special attention of the filtering medium is required. An operator can manually insert a high pressure fluid head into the clean chamber to try to dislodge build-up, or alternatively remove the filter grids and filters for treatment or replacement.

Referring back to FIGS. 1, 3, and 6, dirty liquid chamber 2 is also provided with an overflow pipe 9. Should the filters become clogged with enough solids to prevent adequate liquid flow or should the power in the backwash suction system fail, the level of the dirty liquid would continue to rise until it reaches overflow pipe 9. The excess dirty liquid would then flow out of the filter apparatus through overflow pipe 9 to a designated location. Such prevents the filter apparatus from over filling or from causing influent pipe 1 to back up.

To clean or drain the filter apparatus, a group of pipes are provided. A pair of clean liquid drain pipes 18 are provided at the lower portions of the clean liquid chambers 4 and 6. Such pipe allows for draining such chambers. Additionally, a sludge discharge pipe 17 is provided at a lower portion of dirty liquid chamber 2 to drain remaining dirty water as well as provide access to the chamber to remove sludge that has accumulated in its bottom.

The operation of the filter apparatus will now be described. Dirty liquid enters apparatus 100 via influent pipe 1 and is dumped into dirty water chamber 2 as shown in FIGS. 4 and 6. The dirty liquid passes through filter assembly 3A and 3B whereby solids and other materials are removed from the liquid. Clean liquid passes completely through into clean liquid chambers 4 and 6. Liquid in clean liquid chamber 4 passes into clean liquid chamber 6 via a transfer pipe 5. Once a certain level of clean liquid is achieved in clean liquid chamber 6 as shown in FIG. 8, the clean liquid passes out the effluent pipe 8.

During operation of the filter apparatus, solids and other materials will begin to accumulate on the filter assemblies 3A and 3B, particularly on filters 41 (or 141). When enough of the solids accumulate, the dirty liquid will move slower through filter assemblies than it is entering, and hence the dirty liquid will begin to over-fill dirty liquid chamber 2. When the level reaches float level switch 9, control 20 will be notified a cleaning operation is required. At such time, control 20 will activate a vacuum cycle whereby the wash pump is activated to provide a suction. The suction passes from wash pump 15, through connecting pipe 60, into hollow axle 11, into wash bracket 214, into wash manifold 200, into connection tubes 224, 225 and 226, into vacuum compartments 300, 301 and 302, through and vacuum/wash holes 270, 271, 272 to vacuum solids and other materials from the surface of filters 41 (or 141). When such solids and materials are removed, they pass through the system and is pumped out through the wash discharge pipe 16. Control 20 may also activate a rinsing cycle whereby wash pump is activated to provide a pumping action. Water, cleaning fluid or other chemical cleaning agents may be pulled into wash pump 15 and pumped out through connecting pipe 60, into hollow axle 11, into wash bracket 214, into wash manifold 200, into connection tubes 224, 225 and 226, into vacuum compartments 300, 301 and 302, through and vacuum/wash holes 270, 271, 272 to blast such liquid onto the surface of filters 41. Such has the effect of dislodging any solids or other material that may be difficult to remove with a suction cycle. Control 20 may repeat a suction cycle and/or a rinsing cycle repetitively or in combinations to effectively remove all debris from filters 41 (or 141). Control 20 may also be notified that a cleaning cycle is required with the use of a timer, which can be set to notify at various intervals and durations, depending on a predetermined amount of solids in the wastewater.

Simultaneously during each of the suction cycle and the rinsing cycle, control 20 activates wash motor 13 to rotate wash assembly 110. The wash assembly must be rotated in order for the vacuum heads 200 to effectively clean the entire surface of filters 41. As described above, vacuum head 220 extends radially from the axis of hollow axle 11. As the wash motor rotates wash assembly, vacuum head 220 is able to contact or vacuum/rinse the entire surface area of filters 41. The wash motor is arranged such that the vacuum head can travel clockwise and/or counter clockwise over the filter 41.

Changing of the filter 141 and/or the grid backing plates 142 requires only a few simple steps. When a change process is required, the operator need not drain the dirty liquid chamber 2 and the clean liquid chambers 4 and 6. Sludge discharge pipe 17 has a larger diameter to allow for sludge accumulated in dirty liquid chamber to either drain out or be removed manually by an operator. Even with the chambers full, the operator may remove grid 142 on the filter apparatus (FIG. 14) on which filters 141 are attached, which can be removed regardless of the position of wash assembly 110. The operator only need lift the grid 142 from the dirty liquid chamber 2 to change the filters in the filter apparatus. No cumbersome or complicated apparatus for rotating the filter assembly as in the prior art is present or need to be disassembled to enable removal of filter 141.

Figure 12:
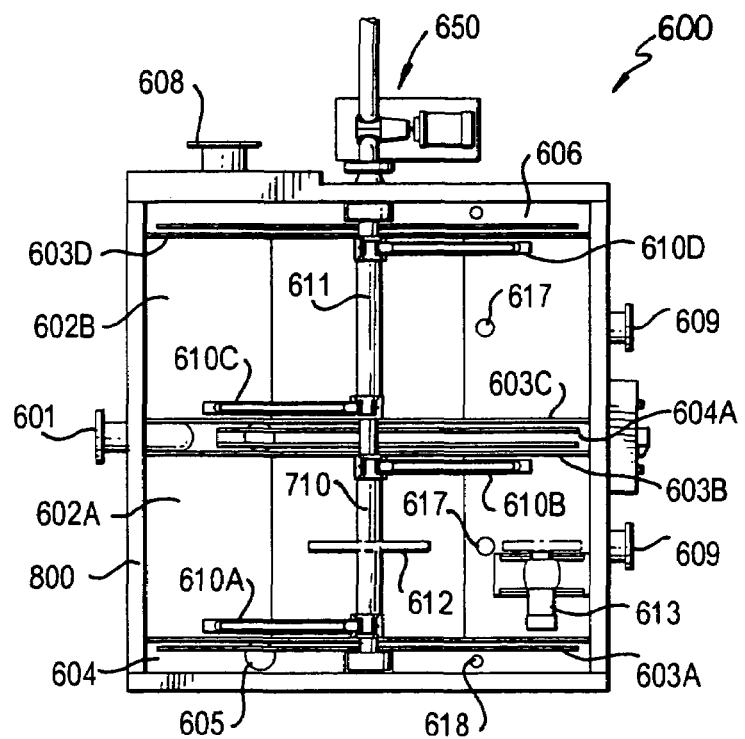
FIG. 12 illustrates a top sectional view of a filter apparatus according to another embodiment of the invention.
Figure 10D:
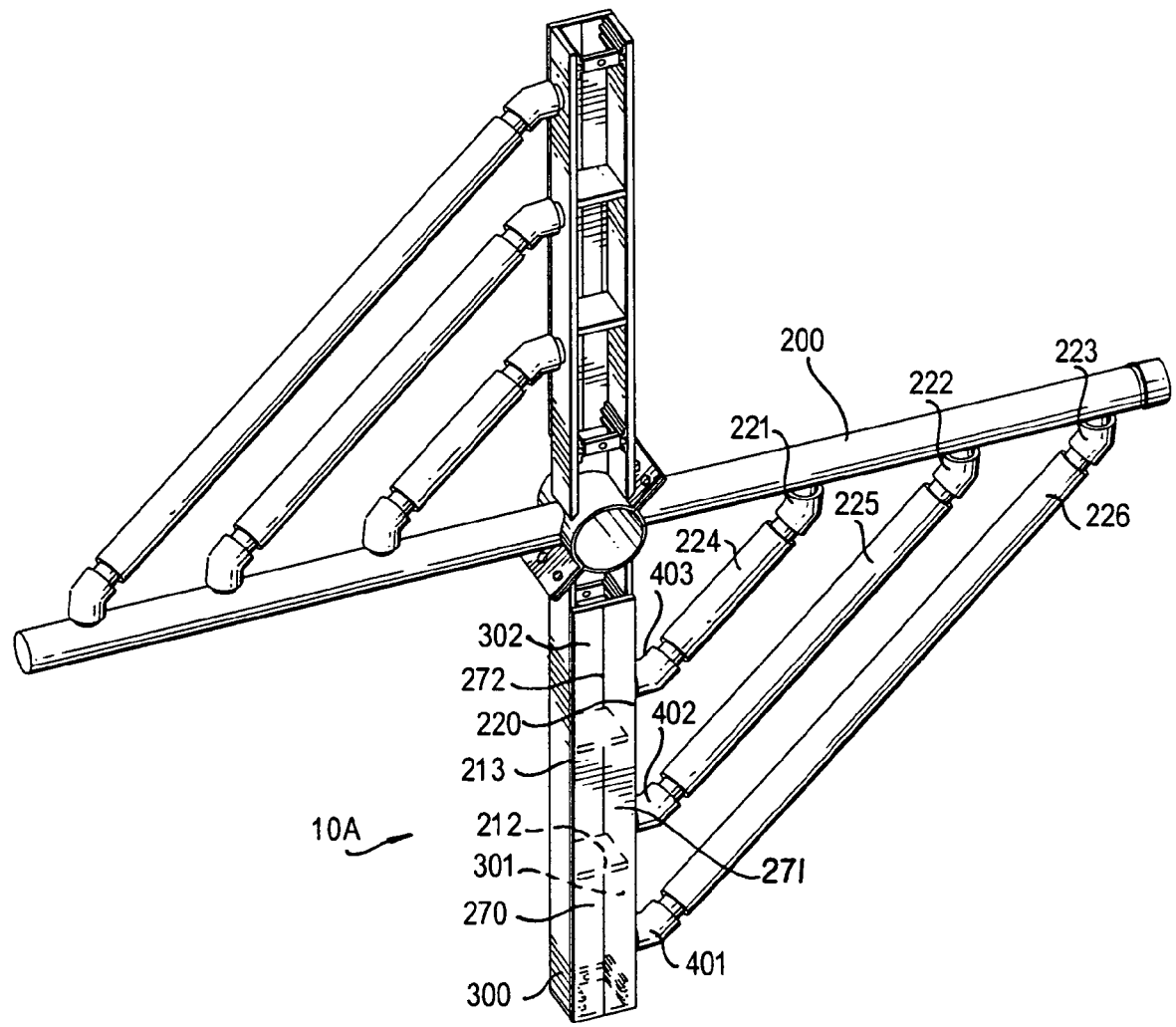
Figure 13:
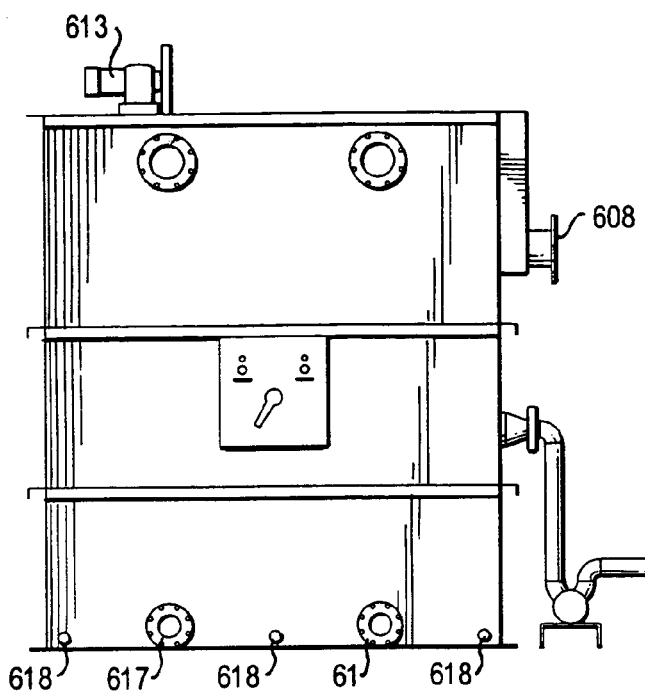
FIG. 13 illustrates a side view of the filter apparatus shown in FIG. 12.
Figure 15:
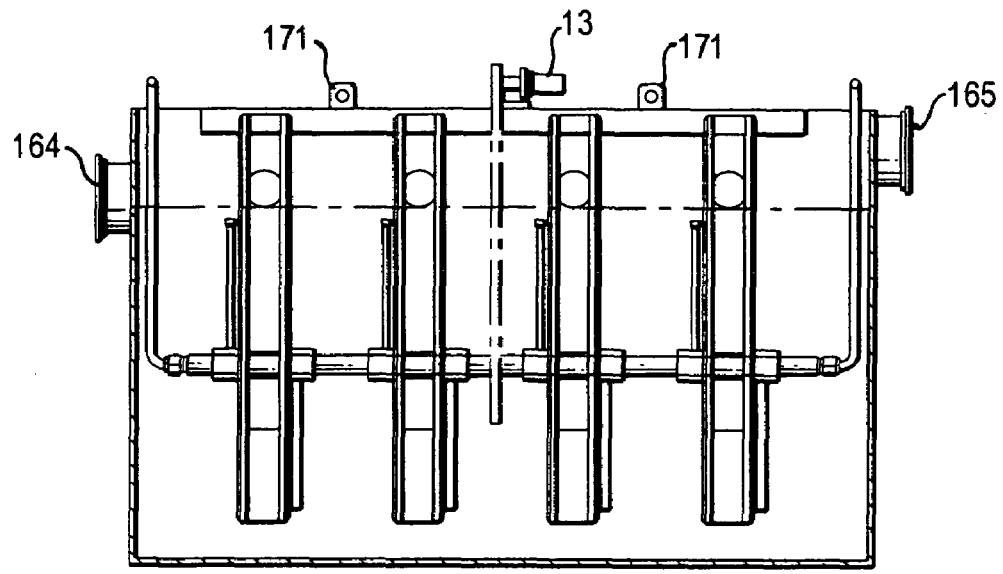
FIG. 15 illustrates the application of the invention to include multiple sections to increase the capacity of the filter apparatus.

A second embodiment of the invention is shown in FIGS. 12 and 13. The invention has generally similar operation and components, but has a second filter and wash assembly incorporated therein. In its operation, dirty liquid enters the filter apparatus 600 through influent pipe 601, which is separated and flows into dirty liquid chambers 602A and 602B. Filter assemblies 603A, 603B, 603C and 603D each filter out solids and materials. The clean water flows into clean liquid chambers 604, 604A and 606. The three chambers are connected via a transfer pipe assembly 605, whereby clean liquid flows in order to maintain an equilibrium between them. The clean water then rises and flows out of the filter apparatus through a effluent pipe 608. However, the embodiment of the invention is not limited to that shown in FIGS. 12 and 13 but can be extended further as shown in FIG. 15 to include any number of additional filtering units.

Wash assembly 710 has a similar appearance and function as disclosed in the previous embodiment, but uses a single wash motor 613 to rotate four wash arms 610A-D about hollow axle 611. Each wash arm 610A-D cleans a respective filter assembly 603A-D. The respective design of each wash arm 610A-D is similar as wash arms 10A and 10B of the previous embodiment. Furthermore, the design of the vacuum and hydraulic pump assembly 650 is similar to the pump assembly shown and described in the previous embodiment.

Dirty liquid chambers 602A and 602B are also provided with overflow pipes 609. Should the filters become clogged with enough solids to prevent adequate liquid flow or should the power in the backwash suction system fail, the level of the dirty liquid would continue to rise in each respective chamber until it reaches overflow pipes 609. The excess dirty liquid would then flow out of the filter apparatus through overflow pipes 609 to a designated location while optionally generating an audible or visible signal advising of the need to inspect the apparatus. Such prevents the filter apparatus from over filling or from causing influent pipe 601 to back up, or operate with clogged filters.

If it becomes necessary to clean or drain the filter apparatus according to this embodiment, a group of pipes are provided. A trio of clean liquid drain pipes 618 are provided at the lower portions of the clean liquid chambers 604, 604A and 606. Such pipe allows for draining such chambers. Additionally, sludge discharge pipes 617 are provided at a lower portion of dirty liquid chambers 602A and 602B to drain remaining dirty water as well as provide access to the chamber to remove sludge that has accumulated in its bottom.

Cleaning of the apparatus of this embodiment would occur in a generally similar manner as that disclosed in the previous embodiment with regard to filter assemblies 603A-D. When a change process is required, the operator need not first drain the dirty liquid chambers 602A and 602B and the clean liquid chambers 604, 604A and 606. Sludge discharge pipes 617 have a larger diameter to allow for sludge accumulated in dirty liquid chamber to either drain out or be removed manually by an operator. Even if the chambers have not been emptied, the operator may remove grid 142 on the filter apparatus (FIG. 14) to gain access to the filter assemblies 141 and through dirty liquid chambers 602A and 602B, on which filters 141 are attached. The operator only needs to lift the grid 142 from the dirty liquid chambers 602A and 602B to change the filters in the filter apparatus.

While the above embodiment discloses a single apparatus having a single body shell having a pair of dirty water chambers and four filter assemblies, the design of the first embodiment may be altered to create a modular design, whereby a group of such filter apparatuses may be aligned side by side. Such would merely require splitting the influent liquid coming in at the influent pipe and sending it into the influent pipe for each filter apparatus. Such can be accomplished by splitting the main pipe into a plurality of branches. Additionally, the clean liquid would have to be collected from each effluent pipe for each filter apparatus. Such can be accomplished with the use of a pipe joint whereby several pipes spill into a single pipe. A further modification would be to mechanically link the hollow axles of each adjacent modular filter apparatus. Such linking of the hollow axles can be accomplished in any manner known to those having ordinary skill in the art. In this manner, the entire row of filter apparatuses could operate under a single wash motor.

An additional embodiment may be to use a single filter assembly in the filter apparatus described in the first embodiment. Such would have the effect of reducing the components required for the filter apparatus.

Figures 17A, 17B:
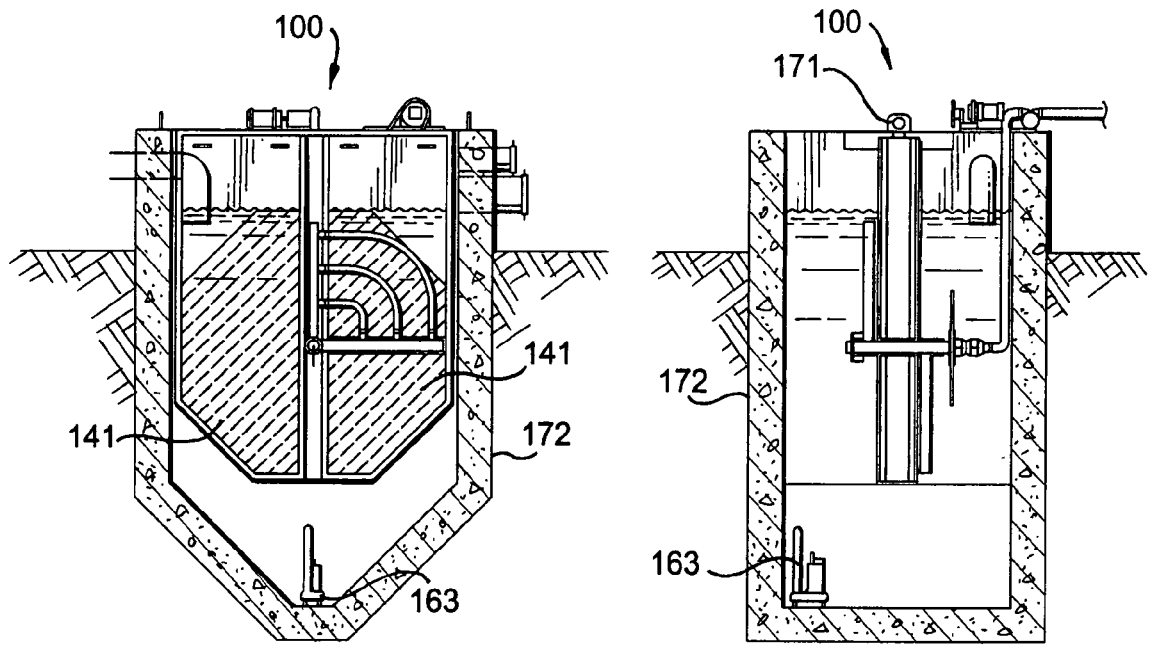
FIGS. 17 A & B illustrate the filter apparatus of the invention in a concrete tank, in plan and side views.
Figure 18:
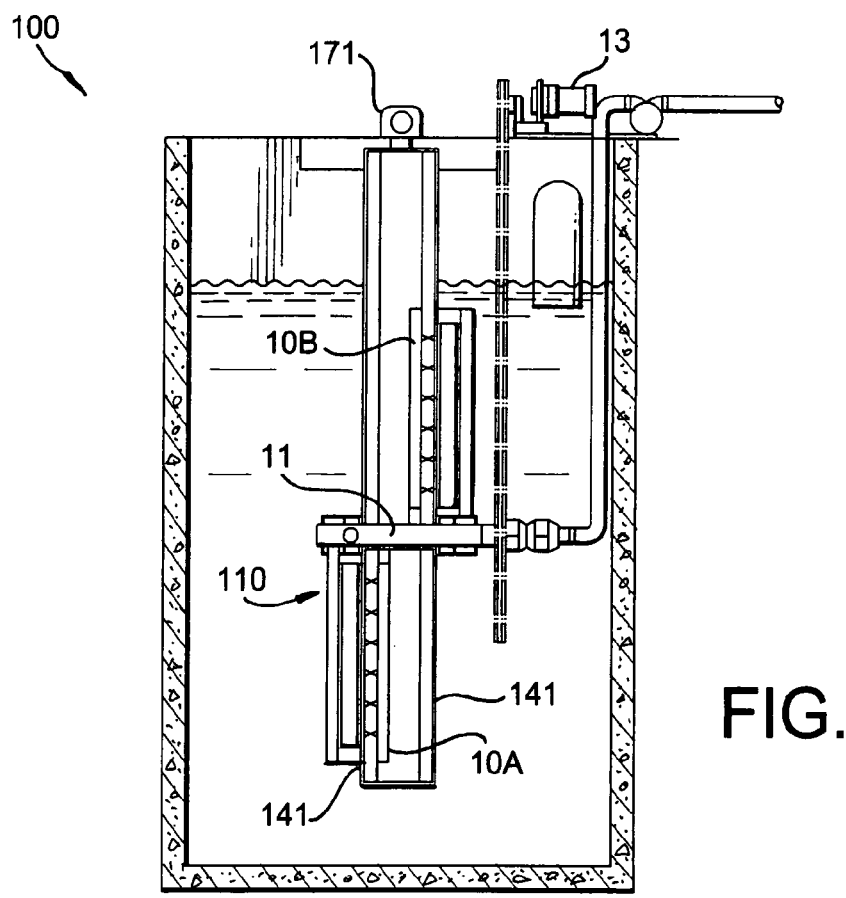
FIG. 18 illustrates the apparatus of the invention with high pressure spray arms to clean the frontside (cleanside) of the filter fabric.

The invention also permits the employment as a retrofit filtering device in an existing tank, such as the concrete tank of FIGS. 17 A and B, respectively. As shown therein, the entire filter device can be mounted in an existing concrete tank 172 by lowering (or raising) the filter apparatus 100 by lifting lug 171. In such a way the filtering apparatus 100 or any of the filters 141 may be removed from the tank for servicing or replacement without the need to drain the tank. Although concrete tank172 is illustrated, it is to be understood that any tank can be retrofitted fiberglass or metal, by the invention.

Figure 16:
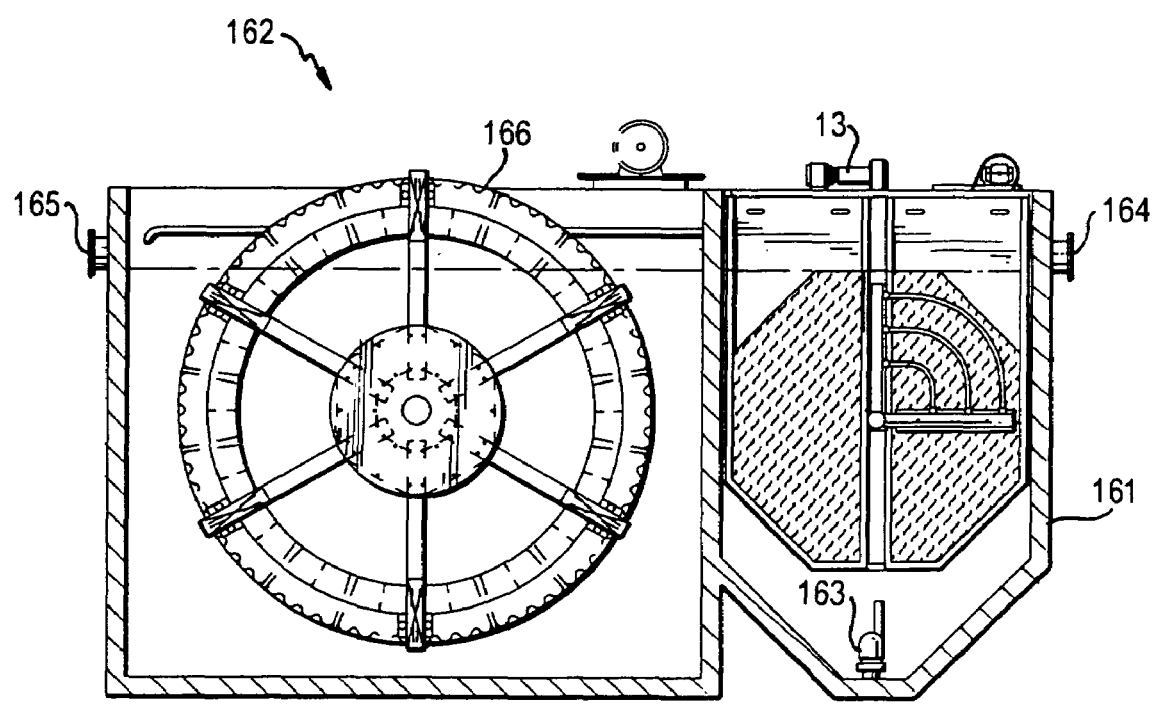
FIG. 16 illustrates a wastewater treatment plant with filter integral in clarifier.

As shown in FIG. 16, the ability to retrofit existing tanks permits the apparatus of the invention to be employed as a filter integral with a clarifying tank 161 of wastewater treatment apparatus 162. As in the embodiment of FIG. 17, the entire filtering apparatus 100 is placed within clarifier tank 161. A sludge return pump 163 is provided with clean effluent exiting clarifier tank 161 via conduit 164. Sludge from return pump 163 can be mixed with new wastewater upstream of the introduction of influent via conduit 165 into an activated sludge process being performed by biowheel 166. In such an embodiment not only is the effluent cleaner than could be achieved by a conventional clarifier but also the space required for the overall waste treatment apparatus 162 is reduced as it is unnecessary to provide a pump or piping to feed the effluent from conduit 164 to a separate filtering unit.

Although the present invention has been described and illustrated in detail, such explanation is to be clearly understood that the same is by way of illustration and example only, and is not to be taken by way of limitation. The particular order of the method steps is not necessarily vital; rather, the inventive steps may be done in numerous orders without depart from the invention herein described. The spirit and scope of the present invention are to be limited only by the terms of claims recited hereinafter.

I claim:

1. A filter apparatus for removing solid, material from an influent liquid in which the solids are contained comprising:
    a single chamber having an influent for receiving the influent liquid and an overflow;
    a plurality of filter modules mounted inside the chamber in parallel wherein said influent liquid passes through each one of the plurality of filter modules to create a filtered effluent liquid; each of the filter modules comprising at least two substantially coplanar grid support plates upon each of which is mounted a filter cloth, the grid support plates being substantially vertically linearly mounted in a C-shaped channel within the filter module and configured so that each grid support plate is individually removable from inside said chamber without the need to drain the chamber or enter the chamber;
    a wash apparatus disposed within the single chamber rotatable about an axis substantially perpendicular to the linearly mounted filter modules and having a plurality of ports; and
    a motor for rotating said wash apparatus, wherein upon rotation of said wash apparatus, said ports suction solid material from the filter cloths of the filter modules.

2. The filter apparatus according to claim 1 wherein the wash apparatus contacts at least one filter cloth.

3. The filter apparatus according to claim 1 further comprising a means for controlling said motor for rotating said wash apparatus.

4. The filter apparatus according to claim 3 wherein said controlling means activates said motor for rotating said wash apparatus upon a float assembly detecting a level of said influent liquid in said single chamber.

5. The filter apparatus according to claim 1 wherein a timer is connected to said motor for rotating said wash apparatus and activates a cleaning cycle at predetermined intervals.

6. The filter apparatus according to claim 1 the filter cloth on each filter module further comprises a pile secured to a foraminous backing.

7. The filter apparatus according to claim 1 wherein said grid support plates are stainless steel.

8. The filter apparatus according to claim 1 wherein said single chamber is a clarifying tank of a wastewater treatment apparatus.

9. The filter apparatus of claim 8 wherein the clarifying tank is an existing clarifying tank of said wastewater treatment apparatus.

10. The filter apparatus according to claim 8 wherein said filter modules are removable from said clarifying tank without the necessity for draining said tank.

11. The filter apparatus according to claim 1 wherein said chamber comprises drain pipes for draining said influent liquid.

12. The filter apparatus of claim 1 further comprising at least one wash hole on said wash apparatus to direct liquid onto the surface of a filter of at least one filter module.

13. A filter apparatus for removing solid material from a liquid comprising:
    a chamber having an influent for receiving influent liquid and an effluent pipe for discharging effluent liquid;
    a plurality of filter modules, each filter module comprising at least two individually removable grid support plates, which grid support plates being substantially vertically, co-linearly mounted in parallel C-shaped channels inside each filter module in said chamber wherein the influent liquid passes through each one of the filter modules arranged in parallel to create said effluent liquid;
    a wash apparatus having a plurality of ports disposed within said chamber rotatable about an axis substantially perpendicular to said linearly mounted filter modules and connected to a vacuum means for suctioning material into said ports; and
    a motor and chain for rotating said wash apparatus about said axis,
    wherein upon rotation of said wash apparatus, said wash apparatus suctions filtered material from said filter module through said ports, wherein the filter modules are individually configured and mounted so as to be removable from said chamber without the need to drain said chamber.

14. The filter apparatus according to claim 13 wherein said wash apparatus comprises:
    a hollow axle concentric with said axis;
    at least one vacuum/pump head mounted on said axle and having said ports; and
    at least one manifold mounted on said axle intercommunicating a respective vacuum/pump head and said hollow axle,
    wherein said hollow axle intercommunicates each said manifold to said pump/vacuum means and wherein said wash apparatus can be removed from said chamber without the need to drain said chamber.

15. The filter apparatus according to claim 14 wherein said at least one vacuum/pump head contacts said at least one filter module.

16. The filter apparatus according to claim 14 wherein said at least one vacuum/pump head has a series of chambers of different sizes each having at least one of said ports.

17. The filter apparatus according to claim 16 wherein a series of connection tubes intercommunicate each said manifold and a respective vacuum/pump chamber.

18. The filter apparatus according to claim 17 wherein each hole for passage of liquid through each connection between a connection tube and said vacuum/pump chamber is of a different size.

19. The filter apparatus according to claim 14 wherein said chamber comprises at least one influent portion which accumulates said influent liquid and a plurality of effluent portions which accumulates said effluent liquid.

20. The filter apparatus according to claim 19 wherein said at least one filter module is located between said each influent portion and said effluent portions.

21. The filter apparatus according to claim 19 wherein each said filter module is cleaned by at least one vacuum head.

22. The filter apparatus according to claim 13 wherein said vacuum means comprises a reversable motor.

23. The filter apparatus of claim 13 further comprising at least one wash hole on said wash apparatus to direct liquid onto the surface of a filter of at least one filter module.

24. The filter apparatus according to claim 23 wherein said liquid is a non water chemical cleaning agent.

* * * * *